H. MIKOREY.
SPRAYER FOR GLUE PAINT, LIQUID GLUE, AND THE LIKE.
APPLICATION FILED MAY 19, 1908.
945,338.
Patented Jan. 4, 1910.
2 SHEETS—SHEET 2.
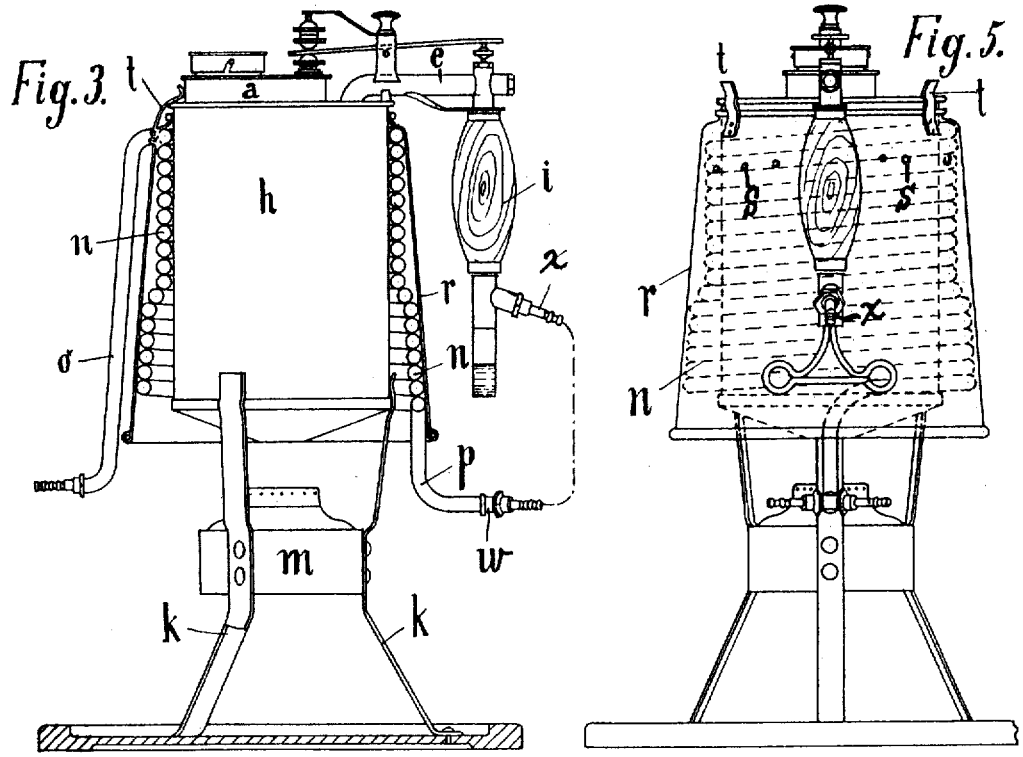
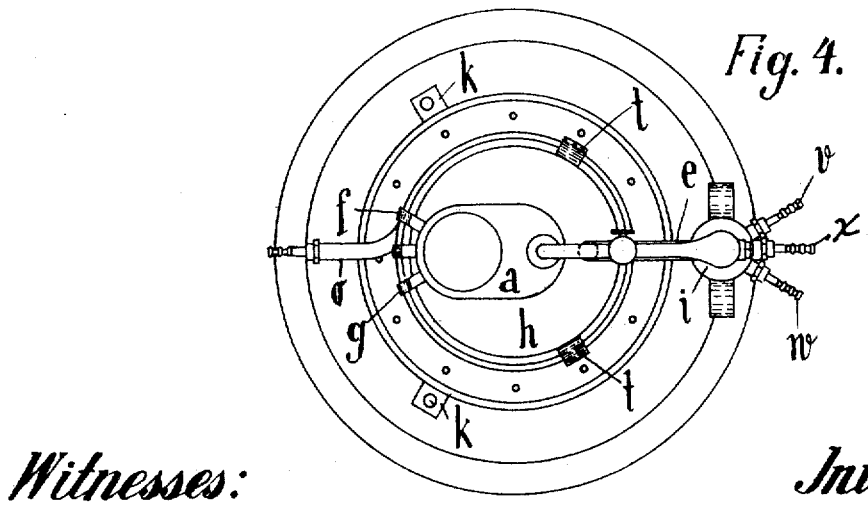
Witnesses:
Inventor:
Hans Mikorey

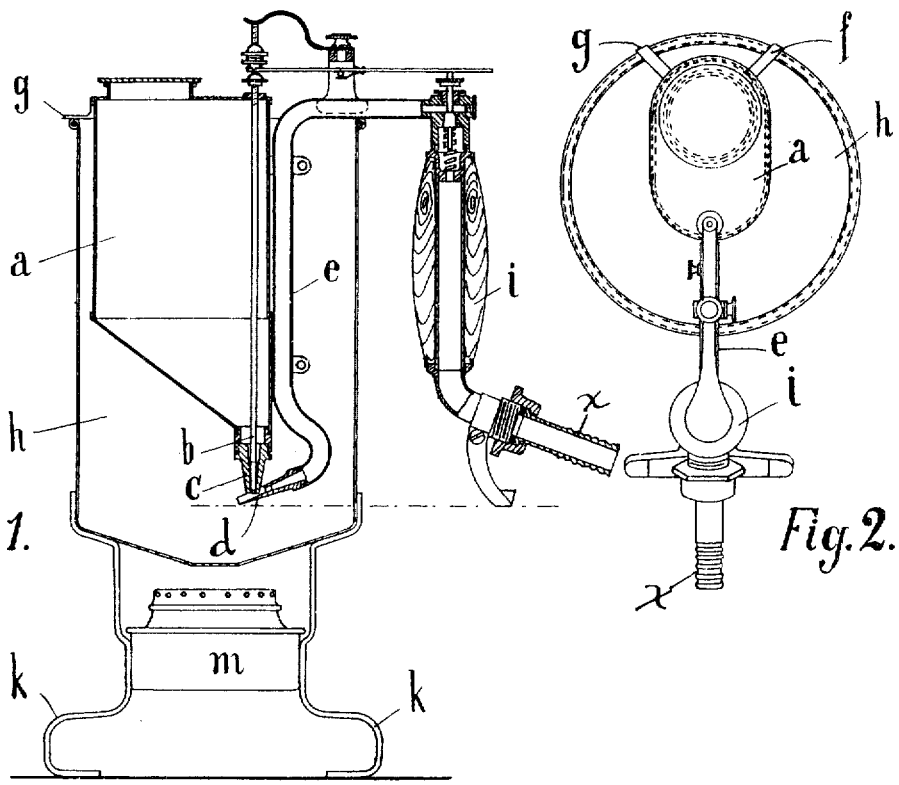
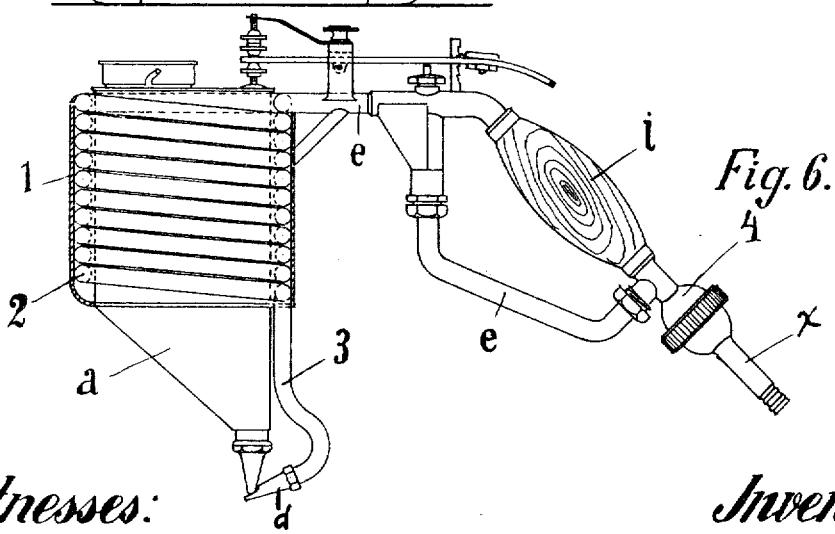

UNITED STATES PATENT OFFICE.

HANS MIKOREY, OF SCHÖNEBERG, NEAR BERLIN, GERMANY, ASSIGNOR TO THE FIRM OF MINIMAX CONSOLIDATED LIMITED, OF BERLIN, GERMANY.

SPRAYER FOR GLUE-PAINT, LIQUID GLUE, AND THE LIKE.

945,338.  Specification of Letters Patent.  Patented Jan. 4, 1910.

Application filed May 19, 1908. Serial No. 433,746.

*To all whom it may concern:*

Be it known that I, HANS MIKOREY, a civil engineer, and a subject of the German Emperor, and a resident of 13 Wartburgstrasse, in the city of Schöneberg, near Berlin, Kingdom of Prussia, and German Empire, have invented a certain new and useful Sprayer or Disperser for Glue-Paint, Liquid Glue, and the Like, of which the following is a specification.

This invention has reference to a sprayer or disperser for glue paint, liquid glue, and the like, which is so arranged and constructed, that it can be easily inserted into a water bath and removed therefrom, in order to be able to heat its contents or to maintain the temperature thereof.

On the drawings three forms of execution of the subject matter of the invention are shown.

Figure 1 shows the sprayer in section, inserted into the heating device. Fig. 2 is a plan view of Fig. 1. Fig. 3 is an elevation and part section of another form of construction of the disperser or sprayer with means for the pre-heating of the pressure fluid. Figs. 4 and 5 are respectively plan and side views of the sprayer or disperser according to Fig. 3; Fig. 6 is another form of construction of the sprayer or disperser with means for heating the same during the operation.

The container $a$ for the reception of the liquid glue, the glue paint or the like, is provided with a nozzle $c$, possessing a valve $b$, and below which the compressed air delivering nozzle $d$ is arranged. The air admission pipe $e$ is preferably arranged, so as to be parallel to the container $a$, and at a suitable height it is bent sidewise, so as to serve as a support for the sprayer together with the stops $f$ and $g$ or the like which are situated at a level with this bent portion; the said sprayer being kept suspended in the heating vessel $h$ which may be filled with water. Upon the air conducting pipe $e$ the handle $i$ is mounted at the outside of the heating vessel $h$, so that the sprayer or disperser can be conveniently inserted into the heating vessel and removed therefrom. Inasmuch as in this arrangement of parts the nozzles are also inserted into the heating vessel, obstruction and choking up of the same by dry glue or the like is obviated.

The heating vessel $h$ is preferably supported on feet $k$ and may be heated by a burner $m$, fed with liquid or gaseous fuel. The arrangement and mode of operation of the valves of the sprayer or disperser may be whatever desired.

In the second form of construction of the sprayer or disperser (Figs. 3 to 5), the heating vessel $h$ for the reception of the container $a$ for the liquid glue or the like, is surrounded by a jacket $r$ in which a coil $n$ or the like, surrounding the container, is arranged, so as to cause the heating by means of the excess heat rising up from the heating device $m$. The heating coil $n$ constitutes a part of the conduit for the compressed air, serving for the operation of the sprayer or disperser, the said coil effecting the preheating of the air, so that, when working with the sprayer or disperser, the nozzles are kept hot, in order to prevent, as much as possible, any solidification of the glue, of the glue paint or the like, so as to prevent any choking up of the nozzles. The compressed air, required for the operation of the sprayer or disperser, is admitted into the coil $n$ by means of the pipe $e$, and it then passes off in a heated condition through the pipe $p$.

The heating of the coil $n$ takes place partly from the container $h$, and partly from the heating gases, ascending from the burner $m$ and along the outside of the container $h$. These gases heat the compressed air, passing through the coil $n$, according to the counter-current principle. The jacket $r$ which surrounds the coil $n$ at a certain distance, and which is preferably downwardly enlarged for the purpose of being sure to catch the ascending gases, presenting a bell-shaped appearance, acts to insure the flowing of the excess of the ascending heating gases of the heating device $m$ to the coil $n$. This jacket $r$ is preferably so arranged, that its upper rim is not closely connected to the container $h$, in order to insure the passing of the heating gases through the jacket. For the same purpose openings $s$ may be arranged likewise in the upper part of the jacket.

It is of advantage, to connect the jacket $r$ with the coil $n$ into a unit, and to provide the jacket $r$ with spring acting hooks $t$ or the like, engaging with the upper edge of the container $h$ and thereby securing the jacket and the coil from becoming detached and falling down from the container $h$. By means of this arrangement it is possible, to detach the coil $n$ and the jacket $r$ easily from the container $h$ for cleaning and repairing purposes. The pipe $p$ is preferably arranged with a fork-shaped end $u$ to which two nipples $v$ and $w$ for the attachment of a hose or rubber tubing, are secured. From these nipples flexible metal tubings or the like, lead to the nipples $x$ of two dispersers or sprayers, so that it is possible to work with one disperser or sprayer, while the other sprayer is kept suspended in the heating vessel.

In order to prevent the contents of the sprayer or disperser from cooling down comparatively quickly, after the sprayer has been removed from the heating device, and after it is operated, the container $a$ of the disperser or sprayer may be heated by hot air or by any other means during operation, so that the contents of the spraying receptacle can be cooled off only at a slow rate. Fig. 6 illustrates a form of construction of this kind of sprayer or disperser which can be heated during the operation, and which may be connected for instance to the discharge end $u$ of the coil $n$, in accordance with Figs. 3 to 5. The liquid container $a$ of the sprayer or disperser according to Fig. 6 is surrounded at a certain distance by a jacket 1. In the space between the container $a$ and the jacket 1 a coil 2 is arranged which is connected on the one hand to the air conducting pipe $e$, and on the other hand to the air nozzle $d$ of the disperser or sprayer by means of the pipe 3. The jacket 1 surrounds the container $a$, making a close fit, so that loss of heat is avoided as much as possible. The air, which has been heated in any suitable manner, is admitted into the coil 2 by means of the nipple $x$, the air filter 4 or the like, and the pipe $e$, the air communicating part of its heat to the liquid container $a$, and escaping through the pipe 3 and the nozzle $d$ sufficiently hot yet, for preventing solidification of the liquid upon or in the interior of the nozzles. The device may also be utilized, if desired, for using the heat, discharged from the container $a$, as a means of heating the air, introduced through the nipple $x$, by the action of the coil 2, so as to prevent solidification of the liquid in the interior and at the nozzles. As will be seen from Fig. 6, the handle $i$ in this form of construction of the sprayer or disperser is not parallel to the longitudinal axis of the liquid container $a$, but the handle is bent, at an angle of 45 degrees for instance, in order to prevent heating of the handle by the source of heat. By means of the arrangement of handle described, the manipulation of the sprayer or disperser is also facilitated, inasmuch as the handle can be touched more conveniently.

What I claim and desire to secure by Letters Patent of the United States is:—

1. The combination, in a disperser or sprayer for glue paint, liquid glue, and the like, of a liquid container carrying a nozzle, an air conducting pipe, provided with a nozzle and connected to and carried along this container, and a heating vessel, capable of being heated, in which the said liquid container, inclusive of the liquid nozzle and the air nozzle may be inserted, all substantially as set forth.

2. In a dispenser or sprayer for glue paint, liquid glue, and the like, the combination of a liquid container, with an elbow shaped air conducting pipe, and with means, keeping together with the one arm of the elbow-shaped air conducting pipe, the liquid container suspended in a heating vessel, substantially as described.

3. The combination, in a disperser or sprayer for glue paint, liquid glue, and the like, of a liquid container carrying a nozzle, an air conducting pipe provided with a nozzle and connected to and carried along this container, a heating vessel, capable of being heated by a burner, means to keep said liquid container suspended in said heating vessel, and a coil which surrounds the heating vessel and through which the compressed air, necessary for the operation of the disperser or sprayer, is passed, to be preheated therein, the coil being heated by the waste heat of the heating vessel and of the burner, all substantially as set forth.

4. The combination, in a disperser or sprayer for glue paint, liquid glue, and the like, of a liquid container, carrying a nozzle, an air conducting pipe provided with a nozzle and connected to and carried along this container, a heating vessel capable of being heated, means to keep said liquid container suspended in said heating vessel, a coil surrounding the heating vessel, and a jacket surrounding said coil, and conveying to it the heat, required for its heating, substantially as set forth.

5. The combination, in a disperser or sprayer for glue paint, liquid glue, and the like, of a liquid container, carrying a nozzle, an air conduction pipe provided with a nozzle and connected to and carried along this container, a heating vessel, capable of being heated, means to keep said liquid container suspended in said heating vessel, a coil surrounding the heating vessel, a jacket surrounding said coil and being connected with it, and means to keep the jacket together with the coil suspended on the upper rim of the heating vessel in an easily detachable manner, substantially as described.

6. The combination, in a disperser or sprayer for glue paint, liquid glue, and the like, of a liquid container carrying a nozzle, an air conducting pipe provided with a nozzle and forming a coil surrounding said liquid container, and a heating vessel, capable of being heated, in which the said liquid container, inclusive of the liquid nozzle and the air nozzle may be inserted, substantially as described.

7. The combination, in a disperser or sprayer for glue paint, liquid glue, and the like, of a liquid container, carrying a nozzle, an air conducting pipe provided with a nozzle and forming a coil surrounding said liquid container, a jacket surrounding said coil of the liquid container, and a heating vessel, capable of being heated, substantially as described.

8. The combination in a disperser or sprayer for glue paint, liquid glue, and the like, of a liquid container carrying a nozzle, an air conducting pipe provided with a nozzle and forming a coil surrounding said liquid container, a jacket surrounding said coil of the liquid container, a heating vessel, capable of being heated by a burner, means to keep said liquid container suspended in said heating vessel, a coil surrounding the heating vessel, and a jacket surrounding the coil of said heating vessel, substantially as set forth.

In witness whereof I have hereunto signed my name this 4th day of May 1908 in the presence of two subscribing witnesses.

HANS MIKOREY.

Witnesses:
 HENRY HASPER,
 WOLDEMAR HAUPT.